Oct. 21, 1941.    B. H. LOCKE    2,259,823

VARIABLE SPEED TRANSMISSION

Filed Dec. 16, 1940    2 Sheets-Sheet 1

Fig. 1.

INVENTOR
Burton H. Locke

Oct. 21, 1941.   B. H. LOCKE   2,259,823
VARIABLE SPEED TRANSMISSION
Filed Dec. 16, 1940   2 Sheets-Sheet 2

INVENTOR
Burton H. Locke

Patented Oct. 21, 1941

2,259,823

UNITED STATES PATENT OFFICE 2,259,823

VARIABLE SPEED TRANSMISSION

Burton H. Locke, Lowell, Mass.

Application December 16, 1940, Serial No. 370,266

3 Claims. (Cl. 74—286)

My invention relates to improvements in variable speed transmission of the form that comprises gearing intermediate a pair of shafts and utilizes adjustable frictional controlling means to effect changes in the transmitted motion; and the main object of my invention is to produce a variable speed transmission wherein only a relatively small portion of the transmitted torque is imposed on the frictional drive thereby permitting the use of relatively small frictional elements. To further minimize the torque imposed on the frictional elements, my improved transmission designs to utilize the said elements at the high speed end of the transmission where the torque is at the minimum.

A further object of my invention is to provide a mechanism wherein relatively large reductions in speed intermediate the drive and driven shafts can be obtained by the use of a minimum number of gears; and a further object is to afford means to effect speed changes therein; so that the final transmitted motion can be minutely adjusted at will from maximum to zero and then reversed as to direction.

By using gears of a compact form and by permitting the use of small frictional parts, it is obvious that my improved transmission could be made compact; could be produced at a relatively low cost and would afford a low maintenance anticipation.

In the accompanying drawings:

Figure 1 is a plan view of my improved variable speed transmission.

Figure 2:
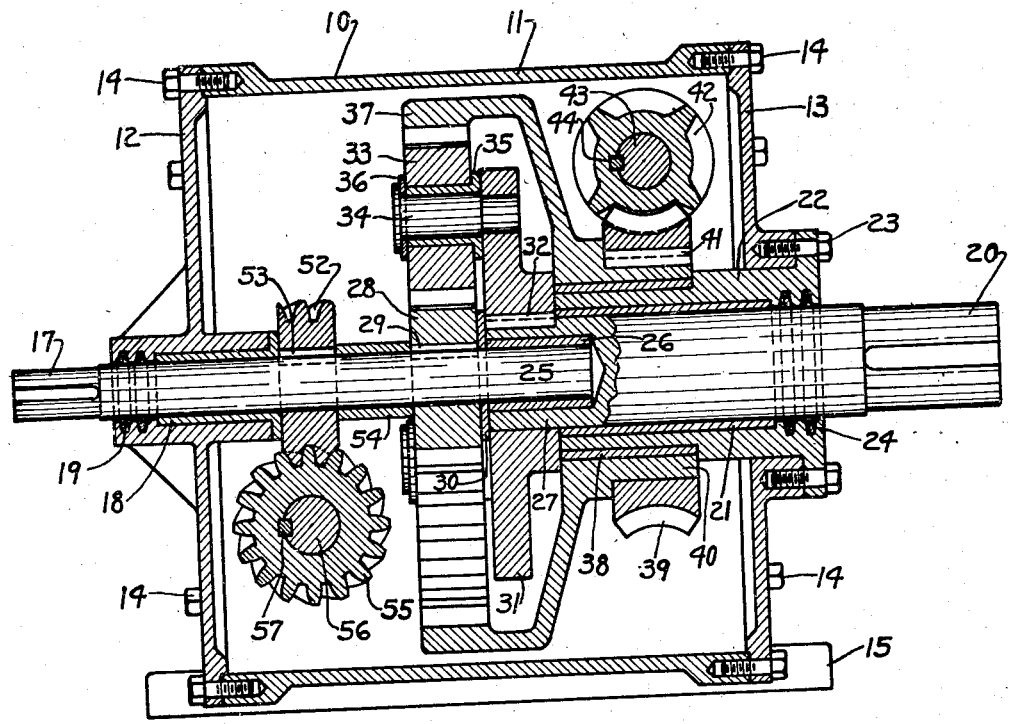
Figure 2 is a sectional side elevation of same taken at 2—2 on Figure 1.
Figure 3:
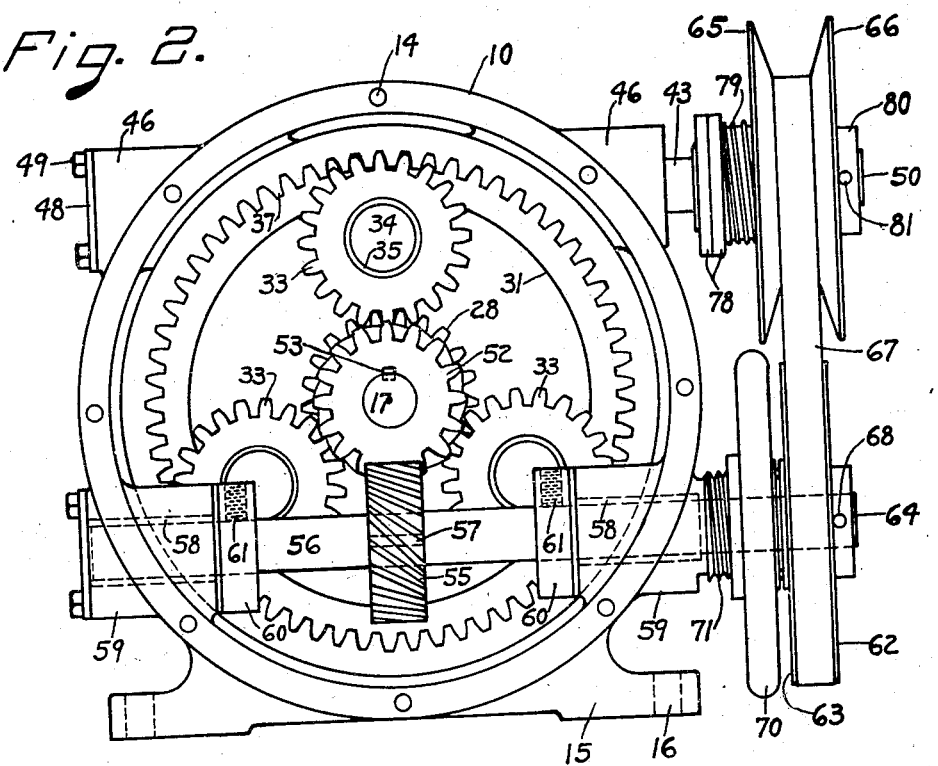
Figure 3 is an end elevation of same taken at the end of the drive shaft and with the end flange removed.

My improved variable speed transmission comprises a casing 10, constructed of a center section 11 and end flanges 12 and 13 fastened thereto by means of cap screws 14. Center section 11 has suitable feet 15, at the bottom portion thereof, with bolt holes 16 to be utilized in mounting the transmission to a base or other anchorage. The casing is generally partially filled with oil to lubricate the interior gearing and bearings which is common practice in the art. A drive shaft 17, generally rotating at high speed, is journaled in bearing 18 supported in end flange 12, and grooves 19, which generally contain felt, are provided to prevent oil escaping from the casing. A driven or low speed shaft 20 is journaled in bearing 21 supported in sleeve 22 which is secured in end flange 13 by cap screws 23. Grooves 24 are provided to prevent oil from escaping from the casing around shaft 20. The inner end 25 of drive shaft 17 is journaled in a bearing 26 supported in the inner end 27 of driven shaft 20. A sun gear 28 is mounted on drive shaft 17 and secured thereto by key 29, and a thrust collar 30 is provided intermediate said gear and the driven shaft 20. A disc 31 is mounted on driven shaft 20 and secured thereto by key 32, said disc 31 carries a plurality of planet gears 33 which mesh with sun gear 28 and are rotatively mounted on studs 34 integrally secured in said disc at equal circumferential spacings around said sun gear. Bushings 35, and thrust collars 36, are provided to form bearings for the planet gears 33. Planet gears 33 mesh with an internal gear 37 rotatively mounted on sleeve 22 and a bearing bushing 38 is provided. A worm gear 39 is secured on the hub 40, of internal gear 37, by key 41 and meshes with a worm 42 secured to a shaft 43 by key 44. Shaft 43 is journaled in bearings 45 mounted in bosses 46 provided on center section 11 of casing 10.

Shaft 43 is generally mounted perpendicular to the axis of worm gear 39 to position worm 42 most effectively to cooperate in checking the rotation of said worm gear to accomplish an objective hereinafter described. One end 47, of shaft 43, terminates within its bearing 45 and the bearing opening is sealed by means of cap 48 secured by cap screws 49. The other end 50, of shaft 43, extends outside of casing 10 for the purpose of receiving variable speed mechanism hereinafter described and grooves 51 are provided to prevent oil escaping from the casing.

A spiral gear 52 is secured on drive shaft 17, adjacent to bearing 18, by key 53 and a spacing sleeve 54 is provided intermediate said spiral gear and sun gear 28 to insure said gears being held in proper spaced relationship on said shaft. Spiral gear 52 meshes with a similar spiral gear 55 secured on a shaft 56 by key 57. Shaft 56 is journaled in bearings 58 mounted in bosses 59 provided on center section 11 of casing 10. Shaft 56 is generally mounted parallel to shaft 43 to facilitate the two said shafts being connected by variable speed mechanism to be described. Thrust collars 60 are secured to shaft 56 by set screws 61 to retain said shaft from endwise movement, otherwise the construction of shaft 56 is like shaft 43.

A pair of cone pulleys 62 and 63 are mounted at the outer end 64 of shaft 56 and a similar pair of pulleys 65 and 66 are mounted at the outer end 50 of shaft 43 for the purpose of cooperating with a common V-belt 67. Cone pulley 62 is secured integral to shaft 56 by means of pin 68 and pulley 63 is mounted to rotate with shaft 56 by key 69, but is free to move laterally on said shaft for the purpose of shifting the position of V-belt 67 intermediate the said pulleys. Handwheel 70 has threaded engagement 71 with boss 59 on center section 11 of casing 10 and when said hand wheel is manipulated it would shift pulley 63 laterally, thereby changing the effective diameter of pulleys 62 and 63 in cooperation with V-belt 67. A ball thrust bearing 72 is provided intermediate pulley 63 and handwheel 70 to minimize friction therebetween when the pulley is rotating.

Cone pulley 65 is secured integral to shaft 43 by means of pin 73 and pulley 66 is mounted to rotate with shaft 43 by key 74 but is free to move laterally thereon and also free to slide within pulley 65. Sleeve portion 75 of pulley 66 has a slot 76 cut therein to clear pin 73 to permit the lateral movement of said pulley. The end portion 77 of sleeve 75 has threaded engagement with adjusting nuts 78 and a compression spring 79 is provided intermediate said nuts and pulley 65. Spring 79 affords pulleys 65 and 66 being in resilient contact with V-belt 67 which, obviously, will retain proper operating tension on the belt at all times as pulleys 62 and 63 are adjusted. It is obvious that pulleys 65 and 66 will be brought nearer together by spring 79 whenever V-belt 67 is released by pulleys 62 and 63 shifting apart. Conversely, whenever pulleys 62 and 63 are adjusted toward each other tension will be set up in the V-belt which would force pulleys 65 and 66 apart against the action of spring 79. Spring 79 can be adjusted to a proper operating condition by means of adjusting nuts 78. Therefore, the relative speeds of shaft 56 and 43 can be readily changed by manipulation of handwheel 70 as this would effect a change in the relative operating position of V-belt 67 on the cone pulleys thereby effecting changes in the effective diameters of said pulleys. Collar 80 is secured to the end 50 of shaft 43 by means of pin 81, for the purpose of insuring retainance of the cone pulleys on the shaft.

In operation it is essential that worm gear 39 be driven in the direction of the torque imposed on same by the operation of the transmission, therefore, the hand of threads on worm 42 and worm gear 39 should be constructed in cooperation with the hand of teeth on spiral gears 52 and 55 to afford such a rotation. Worm 42 is generally made with a plurality of threads to afford proper angle, or lead, to the threads for the purpose of permitting worm 42 to be rotated by worm gear 39 substantially at the point when a normal torque is imposed on said worm gear, resulting by the transmission being operated under a normal load. Under this condition the pull on V-belt 67 would be substantially zero. When a subnormal load is being transmitted it is obvious that there would be a relatively light pull on one side of the V-belt to assist the lessened torque pressure to drive the worm. Conversely, under an abnormal transmitted load a relatively light pull would be imposed at the other side of the V-belt drive to retard the rotation of said worm which would tend to increase by the action of the increased torque pressure.

Therefore, it is obvious that under any transmitted load the work required of the variable speed drive would be relatively light and thus would permit the use of relatively small variable speed equipment which would afford compactness and low cost of construction and maintenance. To further minimize the torque imposed on the variable speed equipment same is positioned at the high speed side of the transmission where the speed is generally high and the torque resultantly low.

Those skilled in the art of transmissions are aware that if the driving shaft of a planetary transmission, such as shaft 17 of the transmission shown, is rotated, the planet gears 33 will rotate and will transmit rotation to the internal gear 37. It is also well known that by holding the internal gear while the driving shaft is rotated, the planet gears will travel around the sun gear 28 and will thus cause rotation of the driven shaft 20 in the direction of the drive shaft 17. Also it is well known that if the internal gear is driven or permitted to rotate at various speeds the rotation of the driven shaft will be effected accordingly, and also the driven rotation of the internal gear could be such as to cause the driven shaft to be rotated in the reverse direction to the drive shaft. Therefore, it is obvious that the rotation of the driven shaft 20 of the transmission shown can be minutely adjusted from the maximum permitted speed in the direction of the rotation of the driving shaft 17 down to zero and then up to its maximum permitted speed in the reverse direction by manipulation of handwheel 70.

Further, it is well known to those skilled in the art of transmissions that when large reductions in speed are required a plurality of planetary reduction sets are utilized in alignment and in such transmissions the driven member of the first set is the driving member of the second set, and so on, with the driven member of the last set transmitting the final motion. Therefore, it is obvious that one or more sets of reduction gears, of the planetary form or of other conventional form, could be utilized proceeding my variable speed transmission in an extended casing where further reductions in speed were required, without departing from the spirit of the invention.

It is obvious that other forms of planetary gearing, and also forms of so called differential gearing, that have three main parts or portions could be harnessed in the manner set forth by applicant to achieve similar results. Also other conventional forms of variable speed drive could be utilized in place of that shown. However, for reason of brevity, applicant has only shown one form of equipment, this being the most successful form of equipment in present day use. Therefore, I do not wish to be confined to the exact details shown as same are susceptible of modification without departing from the spirit or scope of the invention which is broadly set forth in the following claims.

The phrase "at the point of normal operating torque" is used in this application to mean at the point when the transmission is operating under a normal load and at normal or mean output speed. In order to effect a balance to the recession member at this point, it is obvious that the helix angle of worm 42 and worm gear 39 would have to be such as to meet the coefficient of friction of the said helix plus the journal friction encountered at this point.

I claim as my invention:

1. A variable speed transmission comprising a casing, a drive and driven shaft, and gearing intermediate said shafts, said gearing comprising three main parts or portions, one portion being integral to said drive shaft, another portion being integral to said driven shaft, and the third portion being rotatively mounted to recede to effect changes in speed intermediate the drive and driven shafts, and means to control the recession of said third portion from said drive shaft comprising two parts, one of said parts being a balancing means comprising a worm gear integral with said third portion, and a worm mounted to cooperate therewith, said gear and worm having proper helix angle to effect a balance to the said recession substantially at the point of normal operating torque, the other of said parts comprising an adjustable V-belt drive operated from said drive shaft to control the rotation of said worm for the purpose of controlling the said recession.

2. A variable speed transmission comprising a casing, a drive, and driven member, and gearing intermediate said members, said gearing comprising three main parts or portions, one portion being driven from said drive member, another portion transmitting the motion to said driven member, and the third portion being rotatively mounted to recede to effect changes in speed intermediate the drive and driven members, and means to control the recession of said third portion from said drive member comprising two parts, one of said parts being a balancing means comprising a worm gear integral with said third portion, and a worm mounted to cooperate therewith, said gear and worm having proper helix angle to effect a balance to the said recession substantially at the point of normal operating torque, the other of said parts comprising an adjustable V-belt drive operated from said drive member to control the rotation of said worm, for the purpose of controlling the said recession.

3. Means to control the recession permitted in variable speed transmissions to effect changes in speed intermediate the drive and driven members, said means comprising two parts, one of said parts being a balancing means comprising a worm gear integral with the recession member, and a worm mounted to cooperate therewith, said gear and worm having proper helix angle to effect a balance to the said recession substantially at the point of normal operating torque, the other of said parts comprising an adjustable V-belt drive operated from said drive member to control the rotation of said worm, for the purpose of controlling the said recession.

BURTON H. LOCKE.